Nickerson's Meter
116859        PATENTED JUL 11 1871
Fig. 1
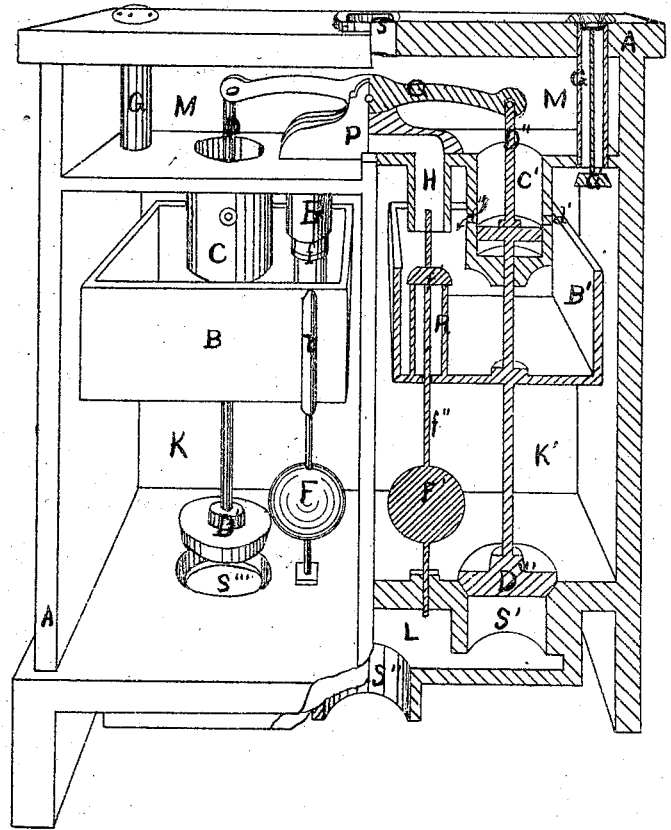
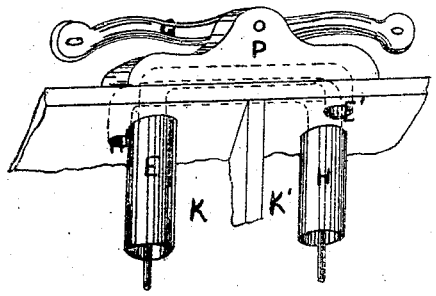
FIG. 2.
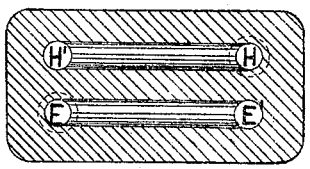
Fig. 3.
WITNESSES. William Edson, A. Van Perry
H. B. Nickerson, INVENTOR.

116,859

UNITED STATES PATENT OFFICE.

HIRAM B. NICKERSON, OF BOSTON, MASSACHUSETTS.

IMPROVEMENT IN LIQUID-METERS.

Specification forming part of Letters Patent No. 116,859, dated July 11, 1871.

*To all whom it may concern:*

Be it known that I, HIRAM B. NICKERSON, of Boston, in the county of Suffolk and State of Massachusetts, have invented certain new and useful Improvements in Meters; and I do hereby declare that the following is a full and exact description thereof, reference being had to the accompanying drawings and to the letters of reference marked thereon.

The nature of my invention consists in combining with two measuring-chambers of known capacity an automatic device consisting of a walking-beam, valves, floats, pipes, and tanks; the whole so arranged that the chambers are filled and emptied alternately. The said tanks, not being measuring-cans, have no direct agency in measuring the fluid, but simply act as mediums for opening and closing the valves.

To enable others skilled in the art to make and use my invention, I will proceed to describe its construction and use.

In the drawings, Figure 1 is a perspective view, showing the interior, one side in part section. Fig. 2 is a perspective view of a part to illustrate more clearly the connecting-pipes between the two measuring-chambers. Fig. 3 shows in plan the pipes that connect the two chambers.

A A is the outside case, including four chambers, namely, the inlet-chamber M M, the two measuring-chambers K and K', and the discharge-chamber L. Q is a walking-beam, pivoted as shown. D D'' are two piston-rods, one attached to each end of the walking-beam Q. As the internal arrangement of the two measuring-chambers is precisely alike, I will describe but one. $d$ is a disk, attached to D'', and so arranged in combination with the tube C that it may close or unclose the orifices $d'$ $d''$. B' is a tank attached to the piston-rod D'', and D''' is a valve attached to the same piston-rod. The disk $d$ and the valve D''' are so located on the piston-rod D'' that when the discharge-orifice S' is open the inlet-orifices $d'$ $d''$ are closed, and vice versa. $f'$ is a small valve attached by valve-stem to the float F', and serves, while the chamber K is partially filled with liquid, to close the opening H, which communicates with the other chamber. R is a tube within the tank B,' and serves to prevent the fluid within the tank from leaking through the orifice around the valve-stem $f''$. The measuring-chambers K and K' are connected by two pipes, as indicated by the dotted lines in P, Fig. 2. One of these pipes opens into the chamber K' at the orifice E', Fig. 2, and passes over and connects with the pipe E in the chamber K, while the other one opens from the chamber K at orifice H', and passes over and connects with the pipe H in the chamber K. Each of the tanks B and B' is provided with a siphon-pipe, one of which is shown at T, Fig. 1, so that as soon as the tank is sufficiently filled to flow over into the long leg of the siphon the liquid within the tank will be drawn off.

The operation of my machine may be set forth as follows: We will suppose that both chambers are empty and the valves are in position as represented in Fig. 1. Let the liquid to be measured be admitted through the inlet S; it will pass down through C' and the orifices $d'$ $d''$ into the tank B'. The weight of the liquid in the tank B' will keep the outlet-valve D''' closed. When the liquid has filled the tank B' it will commence to run out through a siphon, similar to the one represented by T, connected to the tank B', into the measuring-chamber K'. As the liquid fills the chamber K' it will lift the float F' and thus press the valve $f'$ up against the lower end of the tube H, and thus close it. When the measuring-chamber K' has become entirely filled the liquid will begin to pass over, through the pipe E' E, Fig. 2, into the tank B, Fig. 1, until the weight of the liquid in B is sufficient to bear it down, and thus cause the lifting of the outlet-valve D''' in the chamber K', and also to close the small orifices $d'$ $d''$ in C', and to open similar ones in C, thus checking the flow of any more liquid into the chamber K', and directing it into chamber K. This completes one operation of my meter—that is, the measuring-chamber K' has been once filled with liquid, and no more can get in until it has been emptied and the chamber K has been filled. It will be noticed as a peculiarity of my invention that the liquid that opens the valves in one chamber must flow over, through the pipes in P, from the other measuring-chamber, and this can only take place when the chamber from which the liquid is to flow has become entirely filled and the chamber into which the liquid flows is entirely emptied. The reason that the liquid can only flow from the chamber which is completely filled is that it runs out the top—that is, through one of the pipes in P. If there is liquid in both chambers, then both the tubes H and E will be closed by the valves $f' f$, which are operated by the floats F F'.

G and G, Fig. 1, are vent-tubes, and are provided with small valves, one of which is shown at G', Fig. 1, which remains open to allow the escape of any air or gas that may have accumulated in the measuring-chamber, but would be closed by any fluid within the measuring-chamber as soon as the chamber was full.

Any convenient registering device may be attached to this meter.

Having thus described my invention, I will now proceed to set forth my claims:

1. A meter having two measuring-chambers, K and K', of known capacity, and furnished with tanks B and B' for actuating the valves, all arranged and operating substantially as described, and for the purpose set forth.

2. The said measuring-chambers, in combination with the two pipes H H' and E E', provided with valves $f f'$, arranged to operate substantially as described, and for the purpose set forth.

H. B. NICKERSON.

Witnesses:
WILLIAM EDSON.
A. HUN BERRY.